US009810458B2

(12) United States Patent
Hattori et al.

(10) Patent No.: US 9,810,458 B2
(45) Date of Patent: Nov. 7, 2017

(54) FALLING FILM EVAPORATOR

(71) Applicant: DAIKIN INDUSTRIES, LTD., Osaka-shi, Osaka (JP)

(72) Inventors: Keita Hattori, Sakai (JP); Shun Yoshioka, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/320,739

(22) PCT Filed: Jun. 30, 2015

(86) PCT No.: PCT/JP2015/068839
§ 371 (c)(1),
(2) Date: Dec. 20, 2016

(87) PCT Pub. No.: WO2016/002784
PCT Pub. Date: Jan. 7, 2016

(65) Prior Publication Data
US 2017/0138652 A1    May 18, 2017

(30) Foreign Application Priority Data

Jul. 1, 2014    (JP) .................................. 2014-136331

(51) Int. Cl.
*F25B 39/02*    (2006.01)
*F25B 39/00*    (2006.01)

(52) U.S. Cl.
CPC ............ *F25B 39/00* (2013.01); *F25B 39/028* (2013.01); *F25B 2339/021* (2013.01); *F25B 2500/28* (2013.01)

(58) Field of Classification Search
CPC ............................... F25B 39/02; F25B 39/022
(Continued)

(56) References Cited

U.S. PATENT DOCUMENTS 3,366,158 A * 1/1968 Rosenblad ............... B01D 1/22
159/13.3
3,897,218 A * 7/1975 Busweiler ............... B01F 7/028
159/11.1
(Continued)

FOREIGN PATENT DOCUMENTS

JP    8-189726 A    7/1996
JP    2014-20752 A    2/2014
(Continued)

OTHER PUBLICATIONS

International Search Report of corresponding PCT Application No. PCT/JP2015/068839 dated Aug. 11 2015.
(Continued)

*Primary Examiner* — Melvin Jones
(74) *Attorney, Agent, or Firm* — Global IP Counselors, LLP

(57) ABSTRACT

A falling film evaporator includes a heat transfer tube bundle with a heat medium channeled to an interior, a tank with a refrigerant inflow port having the heat transfer tube bundle disposed in the tank, a liquid refrigerant sprinkling part arranged to drop liquid refrigerant onto the heat transfer tube bundle, a vapor outlet tube extending from an upper part of the tank, a cover having a portion positioned in a location inside the tank and higher than the liquid refrigerant sprinkling part, and an impeding member provided between the liquid refrigerant sprinkling part and the cover at a different position than the vapor outlet tube along the longitudinal direction of the heat transfer tubes. The impeding part impedes the flow of refrigerant that flows between the liquid refrigerant sprinkling part and the cover and flows in the longitudinal direction of the heat transfer tubes.

20 Claims, 11 Drawing Sheets

(58) Field of Classification Search
USPC .......................................... 62/515, 524, 525
See application file for complete search history.

(56) References Cited

U.S. PATENT DOCUMENTS

| | | | |
|---|---|---|---|
| 4,349,068 A * | 9/1982 | Coury .................... | C02F 1/043 165/104.27 |
| 5,417,805 A * | 5/1995 | Rosenblad ............ | B01D 1/227 159/13.1 |
| 6,253,571 B1 | 7/2001 | Fujii et al. | |
| 7,637,012 B2 * | 12/2009 | Thors ..................... | B21C 37/20 165/151 |
| 2013/0277018 A1 | 10/2013 | Numata et al. | |

FOREIGN PATENT DOCUMENTS

| | | |
|---|---|---|
| JP | 2014-20753 A | 2/2014 |
| JP | 2014-20754 A | 2/2014 |
| WO | 98/41798 A1 | 9/1998 |

OTHER PUBLICATIONS

International Preliminary Report of corresponding PCT Application No. PCT/JP2015/068839 dated Jun. 30, 2015.
European Search Report of corresponding EP Application No. 15 81 4304.0 dated May 31, 2017.

* cited by examiner

FALLING FILM EVAPORATOR

TECHNICAL FIELD

The present invention relates to a falling film evaporator.

CROSS-REFERENCE TO RELATED APPLICATIONS

This U.S. National stage application claims priority under 35 U.S.C. §119(a) to Japanese Patent Application No. 2014-136331, filed in Japan on Jul. 1, 2014, the entire contents of which are hereby incorporated herein by reference.

BACKGROUND ART

A falling film evaporator such as that disclosed in Japanese Laid-open Patent Publication No. H8-189726 is a prior-art example of an evaporator for refrigerant used in a centrifugal chiller or another refrigeration apparatus. The falling film evaporator is a heat exchanger in which liquid refrigerant is dropped onto a heat transfer tube bundle inside a tank by a liquid refrigerant sprinkling device provided between the heat transfer tube bundle and a vapor outlet tube extending from an upper part of the tank, and the dropped liquid refrigerant is evaporated in the heat transfer tube bundle. Gas refrigerant evaporated by the heat transfer tube bundle flows out of the tank through the vapor outlet tube extending from the upper part of the tank, and the refrigerant is sent to a compressor.

SUMMARY

Technical Problem

In the prior-art falling film evaporator described above, when refrigerant that has been depressurized by an expansion valve or another depressurizing mechanism is supplied into a tank while still in a gas/liquid two-phase state, gas/liquid two-phase refrigerant flows into the liquid refrigerant sprinkling device through a refrigerant inlet tube provided to the tank.

Gas refrigerant included in the gas/liquid two-phase refrigerant flowing into the liquid refrigerant sprinkling device and gas refrigerant produced from the evaporation by the heat transfer tube bundle then flow toward the vapor outlet tube provided above the tank.

In this evaporator, an upper cover is provided between the liquid refrigerant sprinkling device and the vapor outlet tube, in order to impede liquid refrigerant from heading directly to the vapor outlet tube.

However, when refrigerant flows below the upper cover along the longitudinal direction of the heat transfer tubes toward the vapor outlet tube, refrigerant that has collected below the upper cover and in the vicinity of the vapor outlet tube will rise above the upper cover and flow toward the vapor outlet tube side all at once. Therefore, the refrigerant on the verge of rising above the upper cover flows too quickly in the vicinity of the vapor outlet tube, and carry-over, in which liquid refrigerant is carried along to flow out of the tank through the vapor outlet tube, will occur more frequently.

The present invention was devised in view of the foregoing matter, it being an object thereof to provide a falling film evaporator in which the refrigerant flow rate in the vicinity of the vapor outlet tube can be suppressed to be low.

Solution to Problem

A falling film evaporator according to a first aspect is a falling film evaporator used in a refrigeration apparatus, the falling film evaporator having a heat transfer tube bundle, a tank a liquid refrigerant sprinkling part, a vapor outlet tube, a cover, and an impeding member. The heat transfer tube bundle, to the interior of which a heat medium is channeled, has a plurality of longitudinally extending heat transfer tubes. The tank, inside of which the heat transfer tube bundle is disposed, is provided with a refrigerant inflow port. The liquid refrigerant sprinkling part drops liquid refrigerant, which is contained in gas/liquid two-phase refrigerant supplied into the tank through the refrigerant inflow port, onto the heat transfer tube bundle. The vapor outlet tube extends from an upper part of the tank. The cover has a portion positioned in a location inside the tank and higher than the liquid refrigerant sprinkling part. The impeding member, which is provided between the liquid refrigerant sprinkling part and the cover to a different position than the vapor outlet tube along the longitudinal direction of the heat transfer tubes, impedes the flow of refrigerant that flows between the liquid refrigerant sprinkling part and the cover and flows in the longitudinal direction of the heat transfer tubes.

The vapor outlet tube extends from the upper part of the tank. As used here, "upper part of the tank" can mean, e.g., a position vertically higher than the center of gravity of the tank.

In this falling film evaporator, it is possible to impede liquid refrigerant from being guided to the vapor outlet tube in association with the gas refrigerant, in order to suppress the flow rate of refrigerant flowing so as to rise above the upper cover in the vicinity of the vapor outlet tube.

A failing film evaporator according to a second aspect is the falling film evaporator according to the first aspect, wherein the impeding member extends downward from a lower surface of the cover.

In this falling film evaporator, it is possible to sufficiently impede the flow of refrigerant flowing in the longitudinal direction of the heat transfer tubes and flowing along the lower surface of the cover.

A falling film evaporator according to a third aspect is the falling film evaporator according to the first or second aspect, wherein the impeding member is a plate-shaped member having a surface perpendicular to the longitudinal direction of the heat transfer tubes.

The surface perpendicular to the longitudinal direction of the heat transfer tubes is not limited to a surface completely perpendicular with respect to the longitudinal direction of the heat transfer tubes, and, e.g., surfaces that are inclined within a range of ±10 degrees from a surface that is completely perpendicular with respect to the longitudinal direction of the heat, transfer tubes are also included as substantially perpendicular surfaces.

In this falling film evaporator, it is possible to impede the flow of refrigerant flowing in the longitudinal direction of the heat transfer tubes over the lower surface of the cover, and to further suppress the flow rate of refrigerant flowing so as to rise above the cover in the vicinity of the vapor outlet tube.

A falling film evaporator according to a fourth aspect is the falling film evaporator according to any of the first through third aspects, wherein the impeding member is provided on both sides of the vapor outlet tube with respect to the longitudinal direction of the heat transfer tubes.

In this falling film evaporator, the flow of refrigerant flowing below the cover in the longitudinal direction of the heat transfer tubes can be sufficiently impeded, and liquid refrigerant can be more effectively impeded from being guided to the vapor outlet tube in association with the gas refrigerant.

A falling film evaporator according to a fifth aspect is the falling film evaporator according to any of the first through fourth aspects, wherein the impeding member has a portion vertically covered by at least 70% between the liquid refrigerant sprinkling part and the cover.

In this falling film evaporator, the flow rate of refrigerant flowing so as to rise above the cover in the vicinity of the vapor outlet tube can be effectively impeded.

A falling film evaporator according to a sixth aspect is the falling film evaporator according to any of the first through fifth aspects, having a header tube and a one-stage refrigerant tub 34. The header tube is provided between the liquid refrigerant sprinkling part and the cover, the header tube has a plurality of refrigerant holes for allowing refrigerant to pass through from the inner side toward the outside as seen in the longitudinal direction of the heat transfer tubes, and the header tube is capable of guiding refrigerant flowing in through the refrigerant inflow port in a direction extending along the longitudinal direction of the heat transfer tubes while channeling the refrigerant out via the refrigerant holes. The one-stage refrigerant tub is disposed above the liquid refrigerant sprinkling part, and is capable of receiving refrigerant flowing out from the header tube via the refrigerant holes and guiding the refrigerant to the liquid refrigerant sprinkling part. The impeding member is provided at least to a position that is on the outer side of the header tube and that is enclosed by the one-stage refrigerant tub and the cover.

In this falling film evaporator, because the impeding member is provided to a position that is on the outer side of the header tube and that is enclosed by the one-stage refrigerant tub and the cover, it is possible to impede refrigerant that has just flowed out from the header tube from flowing along the longitudinal direction of the heat transfer tubes.

A falling film evaporator according to a seventh aspect is the falling film evaporator according to arty of the first through sixth aspects, wherein the liquid refrigerant sprinkling part is provided so that the longitudinal direction of the liquid refrigerant sprinkling part is the same direction as the longitudinal direction of the heat transfer tubes.

In this aspect, the longitudinal direction of the liquid refrigerant sprinkling part and the longitudinal direction of the heat transfer tubes need not be completely the exact same direction; e.g., the longitudinal direction of the heat transfer tubes may be substantially the same direction as the longitudinal direction of the liquid refrigerant sprinkling part by differing within a range of ±10 degrees.

In this falling film evaporator, liquid refrigerant can be impeded from being guided to the vapor outlet tube in association with the gas refrigerant, even when the refrigerant has been distributed in the longitudinal direction by the liquid refrigerant sprinkling part.

A falling film evaporator according to an eighth aspect is the falling film evaporator according to arty of the first through seventh aspects, wherein a plurality of the impeding members are provided in alignment in the longitudinal direction of the heat transfer tubes so as to have a portion in which the impeding members close to the vapor outlet tube in the longitudinal direction of the heat transfer tubes have narrow gaps in between each other.

In this falling film evaporator, refrigerant tends to flow all together in the portion close to the vapor outlet tube in the longitudinal direction of the heat transfer tubes, but due to the gaps between the impeding members being narrow in this portion, the effect of making refrigerant distribution uniform can be increased.

A falling film evaporator according to a ninth aspect is the falling film evaporator according to any of the first through eighth aspects, wherein a plurality of the impeding members are provided in alignment in the longitudinal direction of the heat transfer tubes so as to have a portion in which the impeding members close to the refrigerant inflow port in the longitudinal direction of the heat transfer tubes have narrow gaps in between each other.

In this falling film evaporator, refrigerant tends to flow all together in the portion close to the refrigerant inflow port in the longitudinal direction of the heat transfer tubes, but due to the gaps between the impeding members being narrow in this portion, the effect of making refrigerant distribution uniform can be enhanced.

Advantageous Effects of Invention

In the falling film evaporator according to the first aspect, liquid refrigerant can be impeded from being guided to the vapor outlet tube in association with the gas refrigerant.

In the falling film evaporator according to the second aspect, the flow of refrigerant flowing in the longitudinal direction of the heat transfer tubes, along the lower surface of the cover, can be sufficiently impeded.

In the falling film evaporator according to the third aspect, the flow rate of refrigerant flowing so as to rise above the cover in the vicinity of the vapor outlet tube can be further suppressed.

In the falling film evaporator according to the fourth aspect, liquid refrigerant can be more effectively impeded from being guided to the vapor outlet tube in association with the gas refrigerant.

In the falling film evaporator according to the fifth aspect, the flow rate of refrigerant flowing so as to rise above the cover in the vicinity of the vapor outlet tube can be effectively suppressed.

In the falling film evaporator according to the sixth aspect, it is possible to impede refrigerant that has just flowed out from the header tube from flowing along the longitudinal direction of the heat transfer tubes.

In the falling film evaporator according to the seventh aspect, liquid refrigerant can be impeded from being guided to the vapor outlet tube, even when the refrigerant has been distributed in the longitudinal direction by the liquid refrigerant sprinkling part.

In the falling film evaporator according to the eighth aspect, the effect of making refrigerant distribution uniform can be enhanced.

In the failing film evaporator according to the ninth aspect, the effect of making refrigerant distribution uniform can be enhanced.

DESCRIPTION OF EMBODIMENTS

An embodiment of a falling film evaporator is described below on the basis of the drawings.

(1) Overall Configuration

Figure 1:
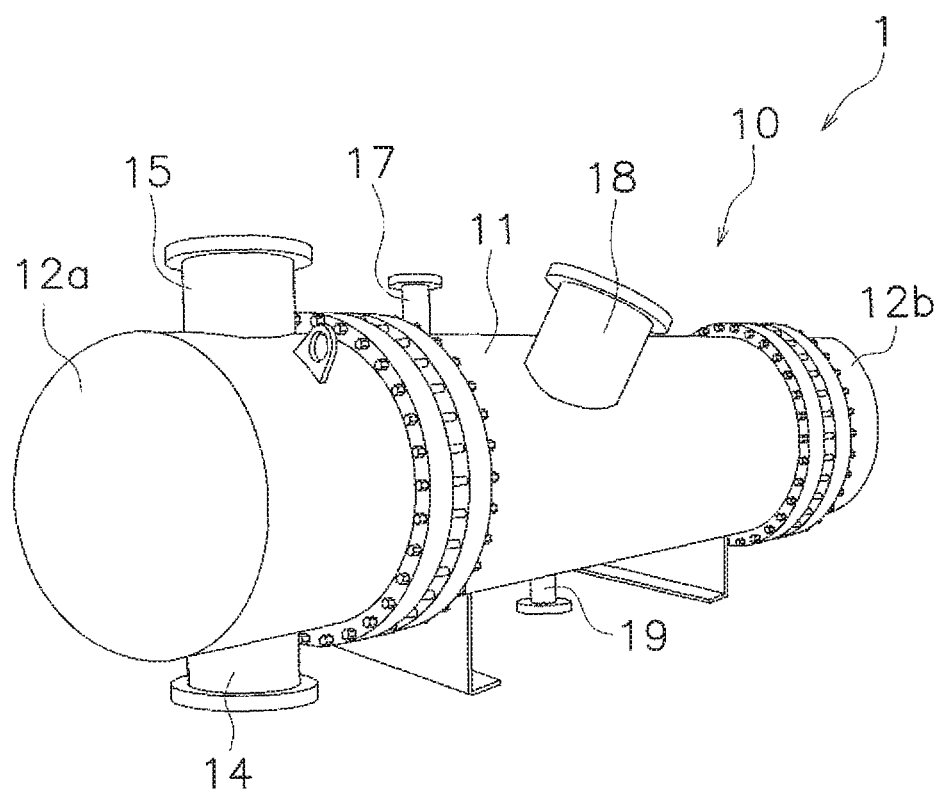
FIG. 1 is an external view of a falling film evaporator relating to an embodiment of the present invention.

FIG. 1 is an external view of a falling film evaporator 1 relating to an embodiment of the present invention. The falling film evaporator 1 is used as an evaporator of a centrifugal chiller or another relatively large-capacity refrigeration apparatus. Specifically, in this type of refrigeration apparatus, a compressor, a radiator, an expansion mechanism, and/or other components (not shown) are provided along with the falling film evaporator 1, and a vapor-compression refrigerant circuit is configured by these devices. In this type of vapor-compression refrigerant circuit, gas refrigerant discharged from the compressor radiates heat in the radiator. The refrigerant having radiated heat in the radiator is depressurized in the expansion mechanism, whereby the refrigerant becomes gas-liquid two-phase refrigerant. The gas-liquid two-phase refrigerant flows into the falling film evaporator 1, evaporates to gas refrigerant due to heat exchange with water, brine, or another heat medium, and flows out from the falling film evaporator 1. The gas refrigerant having flowed out from the falling film evaporator 1 is drawn back into the compressor. Liquid refrigerant that could not be evaporated by heat exchange with the water, brine, or other heat medium passes through a liquid refrigerant return tube or the like (not shown) to merge with the gas-liquid two-phase refrigerant flowing into the falling film evaporator 1, and again flows into the falling film evaporator 1.

Figure 2:
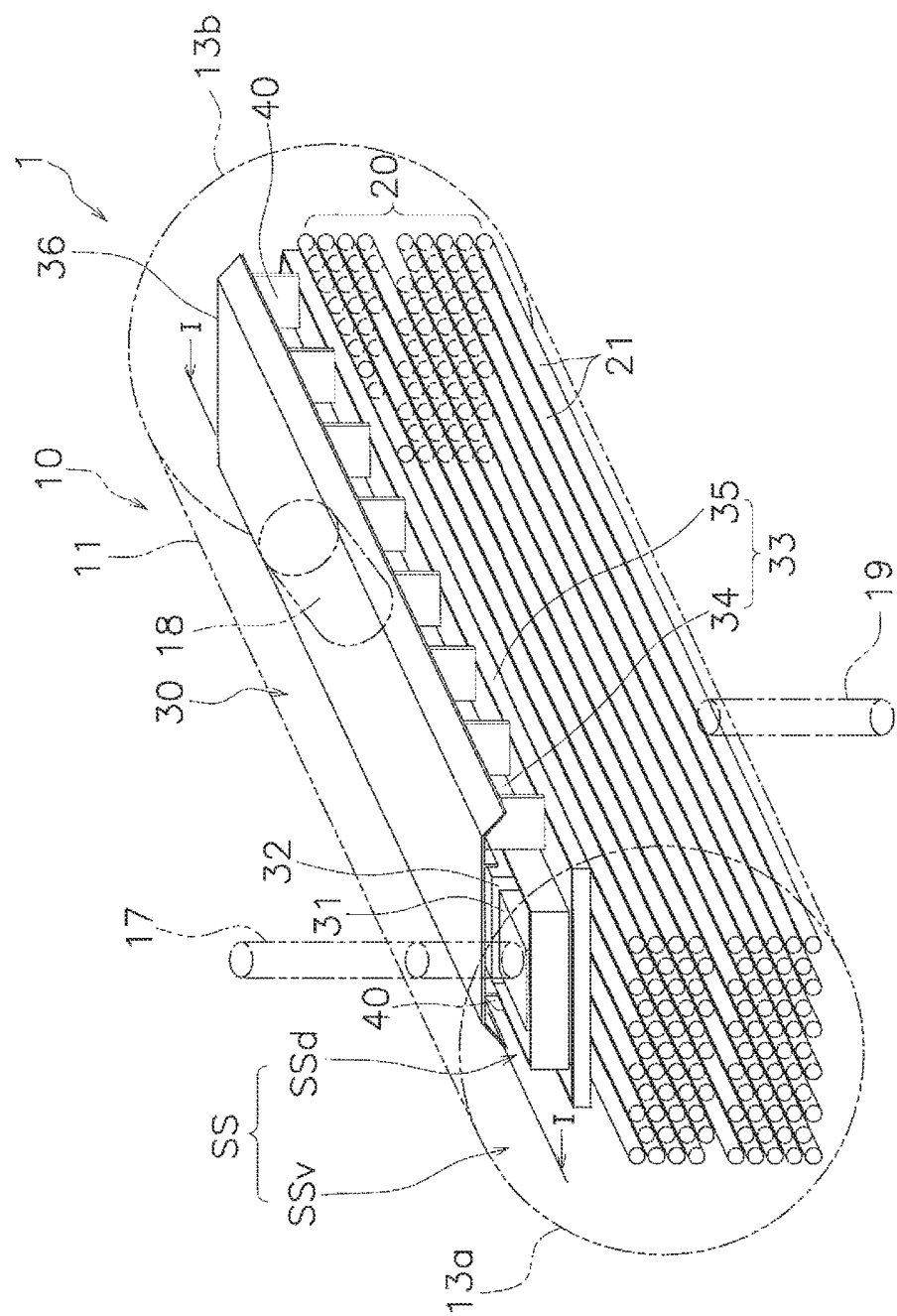
FIG. 2 is a schematic perspective view showing the internal structure of the falling film evaporator.
Figure 3:
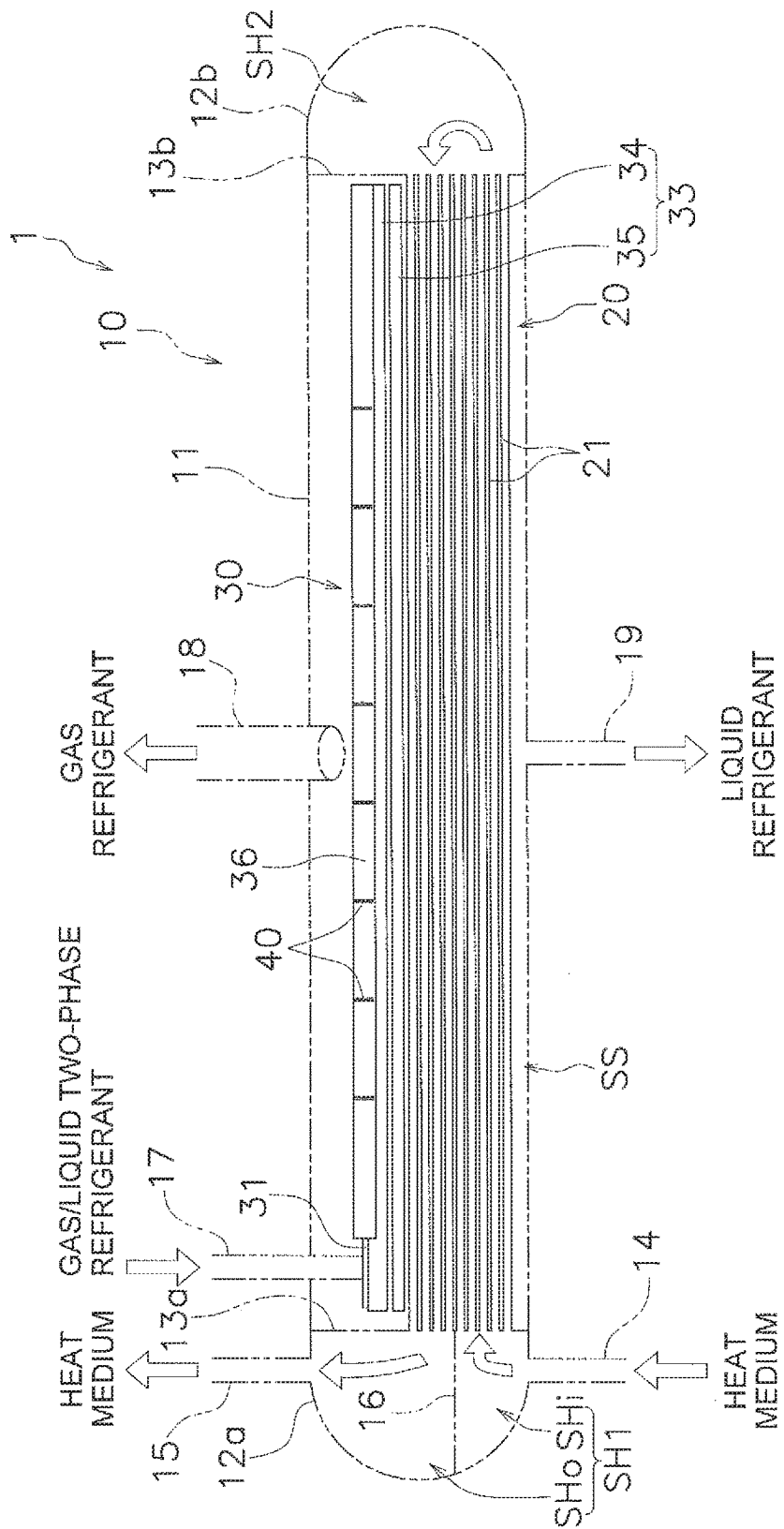
FIG. 3 is a cross-sectional view of the falling film evaporator as seen from a horizontal direction orthogonal to the longitudinal direction of a tank.
Figure 4:
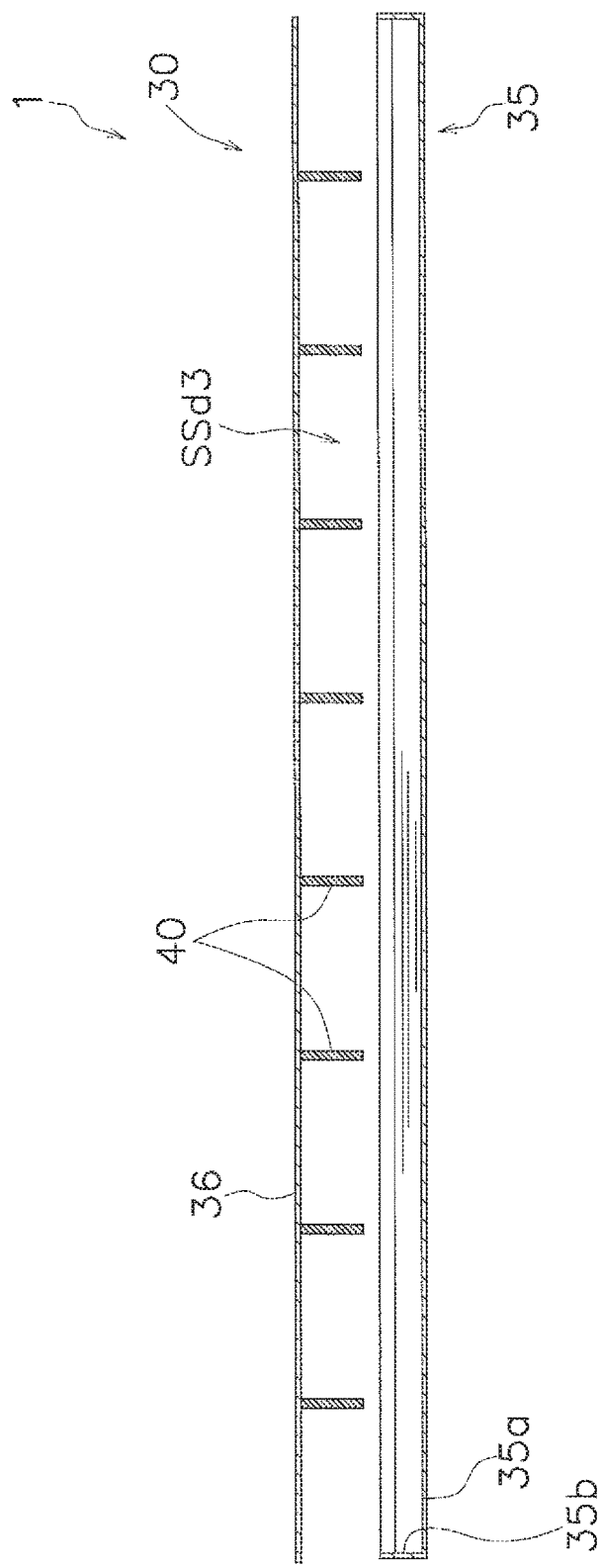
FIG. 4 is a cross-sectional view (showing only a one-stage refrigerant tub, a two-stage refrigerant tub, and a partition plate) along line I-I of FIGS. 2 and 5.
Figure 5:
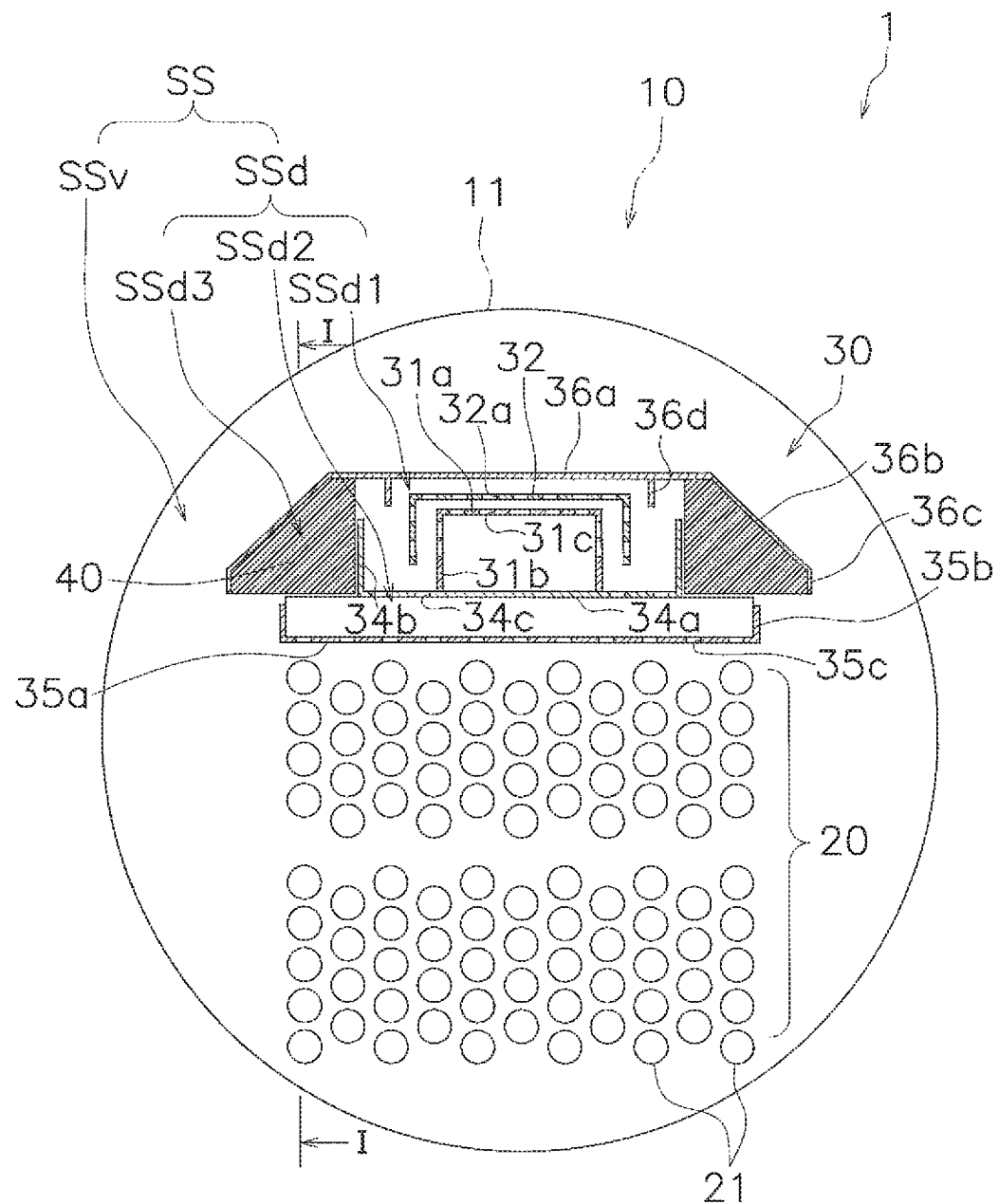
FIG. 5 is a cross-sectional view of a vapor outlet tube portion of the failing film evaporator, as seen from the longitudinal direction of the tank.
Figure 6:
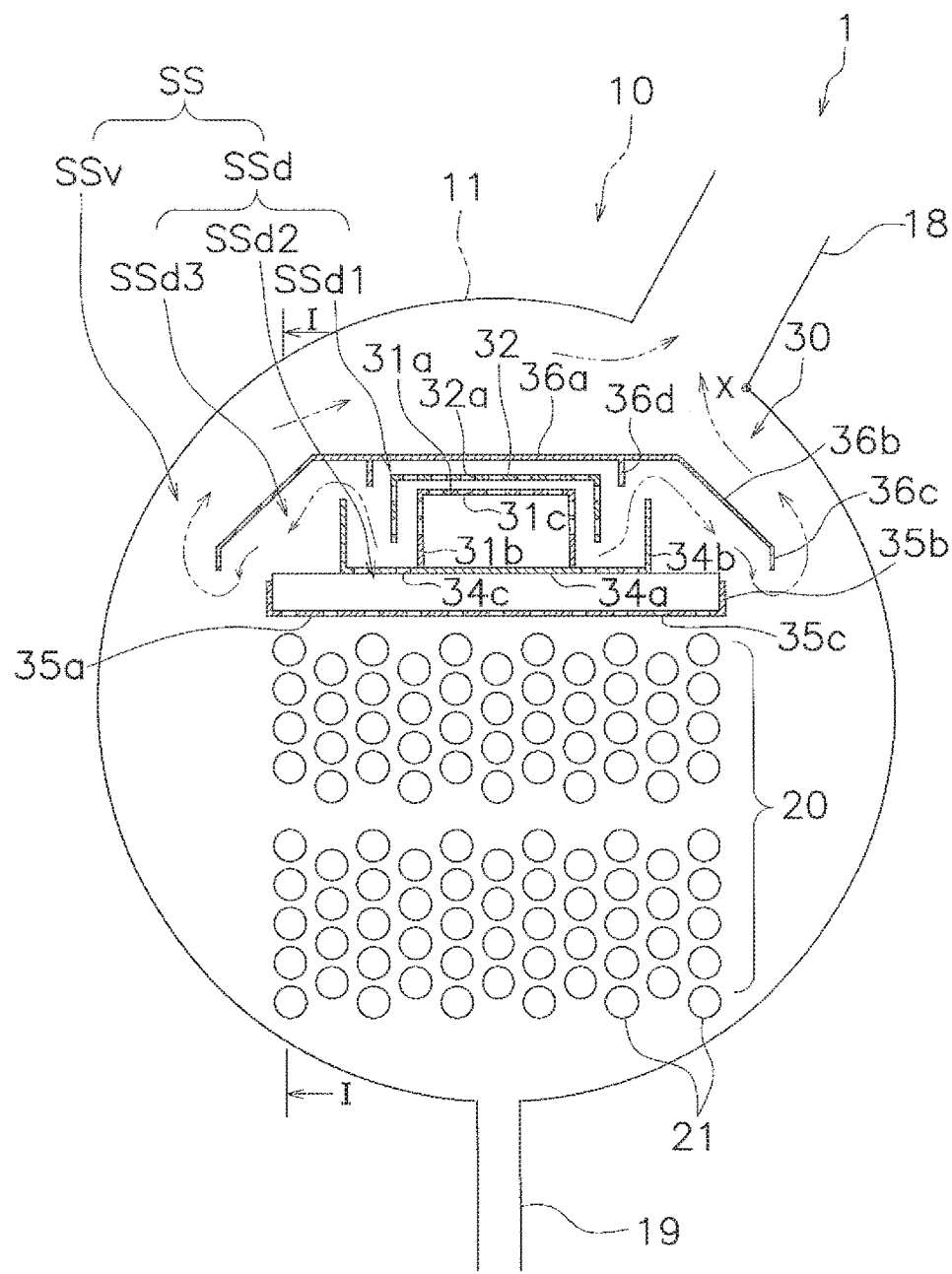
FIG. 6 is a cross-sectional view of a perpendicular plate portion of the falling film evaporator, as seen from the longitudinal direction of the tank.

In this embodiment, a horizontal shell and tube heat exchanger is employed as the falling film evaporator 1. The falling film evaporator 1 primarily has a tank 10, a heat transfer tube bundle 20, and a liquid refrigerant sprinkling device 30, as shown in FIGS. 1 to 5. FIG. 2 in this case is a perspective view showing the internal structure of the falling film evaporator 1. FIG. 3 is a cross-sectional view of the falling film evaporator 1 as seen from a horizontal direction orthogonal to the longitudinal direction of the tank 10. FIG. 4 is a cross-sectional view (showing only a one-stage refrigerant tub 34, a two-stage refrigerant tub 35, and perpendicular plates 40, described hereinafter) along line of FIGS. 2, 5, and 6. FIG. 5 is a cross-sectional view, as seen from the longitudinal direction of the tank 10, of the portion of the failing film evaporator 1 where a vapor outlet tube 18 is located. FIG. 6 is a cross-sectional view, as seen from the longitudinal direction of the tank 10, of the portion of the falling film evaporator 1 where the perpendicular plates 40 are located. The terms used in the description below to indicate direction, such as "up," "down," "left," "right," and "horizontal," refer to the directions in a state in which the falling film evaporator 1 shown in FIG. 1 has been installed and is in use.

(2) Tank 10

The tank 10 has primarily a shell 11 and heads 12a, 12b. The shell 11 in this embodiment is a horizontal, cylindrical member open at both longitudinal end portions. The heads 12a, 12b are bowl-shaped members that close the openings at both longitudinal end portions of the shell 11. In FIGS. 1 to 3, the head that, between the heads 12a, 12b, is disposed on the left side of the shell 11 is designated as the head 12a, and the head that is disposed on the right side of the shell 11 is designated as the head 12b.

A tube plate 13a is disposed so as to be sandwiched between the head 12a and the shell 11. A tube plate 13b is also disposed so as to be sandwiched between the head 12b and the shell 11. The tube plates 13a, 13b are substantially disc-shaped members in which tube holes (not shown) are formed, and both longitudinal end portions of a plurality of heat transfer tubes 21 constituting the heat transfer tube bundle 20 are inserted through and secured in the tube holes of the tube plates. The space in the tank 10 is thereby horizontally divided into a head space SH1 enclosed by the head 12a and the tube plate 13a, a shell space SS enclosed by the shell 11 and the tube plates 13a, 13b, and a head space SH2 enclosed by the head 12b and the tube plate 13b.

A heat medium inlet tube 14 and a heat medium outlet tube 15 are provided to the head 12a. The heat medium inlet tube 14 is a tube member for channeling a heat medium into the head space SH1 of the tank 10, and in this embodiment is provided to a lower part of the head 12a. The heat medium outlet tube 15 is a tube member for channeling the heat medium out of the head 12a of the tank 10, and in this embodiment is provided to an upper part of the head 12a. The head space SH1 is divided by a head space partition plate 16 into a lower head space SHi communicating with the heat medium inlet tube 14, and an upper head space SHo communicating with the heat medium outlet tube 15. The heat medium that has been channeled through the heat medium inlet tube 14 into the lower head space SHi of the head 12a is thereby channeled into the plurality of heat transfer tubes 21 (in this embodiment, the plurality of heat transfer tubes 21 configuring a lower part of the heat transfer tube bundle 20) communicating with the lower head space SHi and sent to the head space SH2. The heat medium sent to the head space SH2 flows so as to turn back upward within the head space SH2, after which the heat medium is channeled into the plurality of heat transfer tubes (in this embodiment, the plurality of heat transfer tubes 21 configuring the upper part of an heat transfer tube bundle 20) communicating with the upper head space SHo and sent to the upper head space SHo. The heat medium sent to the upper head space SHo flows out of the upper head space SHo (i.e., flows out from the falling film evaporator 1) through the heat medium outlet tube 15.

A refrigerant inlet tube 17, a vapor outlet tube 18, and a liquid outlet tube 19 are provided to the shell 11. The refrigerant inlet tube 17 is a tube member for channeling gas-liquid two-phase refrigerant into the shell space SS of the tank 10, and in this embodiment is provided in a portion in an upper part of the shell 11 and in the longitudinal left side of the shell 11. The distal end of the refrigerant inlet tube 17, which is inside the shell 11, acts as a refrigerant inflow port through which refrigerant is channeled into the tank 10. The vapor outlet tube 18 is a tube member for channeling gas refrigerant out of the shell space SS of the tank 10, the gas refrigerant having been produced by evaporation in the heat transfer tube bundle 20. In this embodiment, the vapor outlet tube 18 is provided above the shell 11 in a position inclined from the upper end by approximately 30 degrees relative to vertically upward as seen in the longitudinal direction of the shell 11, and is provided so as to extend out from approximately the longitudinal middle of the shell 11. The liquid outlet tube 19 is a tube member for channeling liquid refrigerant that could not evaporate in the heat transfer tube bundle 20 out of the shell space SS of the tank 10, and in this embodiment is provided to a lower part of the shell 11 and approximately the longitudinal middle of the shell 11 (see FIG. 6). Within the gas-liquid two-phase refrigerant supplied into the shell space SS of the tank 10 through the refrigerant inlet tube 17, the liquid refrigerant is thereby sprinkled from above the heat transfer tube bundle 20 by the liquid refrigerant sprinkling device 30. The liquid refrigerant sprinkled on the heat transfer tube bundle 20 is evaporated into gas refrigerant by heat exchange with the heat medium flowing within the heat transfer tubes 21 configuring the heat transfer tube bundle 20. The gas refrigerant produced by evaporation in the heat transfer tube bundle 20 flows at an upward slant toward the vapor outlet tube 18, and flows out of the shell space SS of the tank 10 through the vapor outlet tube 18. The gas refrigerant flowing out of the shell space SS of the tank 10 is drawn back into the compressor. Liquid refrigerant that could not be evaporated in the heat transfer tube bundle 20 flows out of the shell space SS of the tank 10 through the liquid outlet tube 19 provided to the lower part of the shell space SS of the tank 10. Having flowed out of the shell space SS of the tank 10, the liquid refrigerant passes through the liquid refrigerant return tube or the like to merge with the gas-liquid two-phase refrigerant flowing into the shell space SS of the tank 10, and flows back into the shell space SS of the tank 10 through the refrigerant inlet tube 17.

(3) Heat Transfer Tube Bundle 20

The heat transfer tube bundle 20 has the plurality of heat transfer tubes 21 extending along the longitudinal direction of the tank 10. When viewed along the longitudinal direction of the tank 10, the heat transfer tube bundle 20 is disposed approximately in the horizontal middle within the shell space SS of the tank 10, in a portion near the vertical bottom. When viewed along the longitudinal direction of the tank 10, the plurality of heat transfer tubes 21 are disposed in numerous columns and numerous rows, and in this embodiment are disposed in a staggered arrangement of eleven columns and nine rows. Both longitudinal end portions of the heat transfer tubes 21 extend to the tube plates 13*a*, 13*b*, and both end portions are inserted through and secured in the tube holes (not shown) of the tube plates 13*a*, 13*b*. Both longitudinal end portions of the heat transfer tubes 21 configuring the vertically upper portion of the heat transfer tube bundle 20 are communicating with the lower part of the head space SH2 and the lower head space SH1, and both longitudinal end portions of the heat transfer tubes 21 configuring the vertically lower portion of the heat transfer tube bundle 20 are communicating with the upper part of the head space SH2 and the upper head space SHo.

The number and/or arrangement of the heat transfer tubes 21 configuring the heat transfer tube bundle 20 are not limited to the number and/or arrangement of the present embodiment, and various numbers and/or arrangements can be employed. Moreover, heat transfer tubes in the shape of a letter U may be employed in a case of employing a tank in which a tube plate and a head are provided only to one longitudinal end portion of the shell.

(4) Liquid Refrigerant Sprinkling Device 30

The liquid refrigerant sprinkling device 30 is disposed vertically between the vapor outlet tube 18 and the heat transfer tube bundle 20 inside the shell space SS of the tank 10. The liquid refrigerant sprinkling device 30 has primarily a header tube 31, a refrigerant tub 33, and an upper cover 36.

The header tube 31 is a tube member for guiding gas-liquid two-phase refrigerant, which is supplied through the refrigerant inlet tube 17 into the shell space SS of the tank 10, to the refrigerant tub 33 (the one-stage refrigerant tub 34 in this embodiment). The header tube 31 is a tube member extending along the longitudinal direction of the tank 10. One end portion of the header tube 31 (the left-side end portion in this embodiment) is connected to the refrigerant inlet tube 17. In this embodiment, the header tube 31 has a substantially rectangular cross section as seen from the longitudinal direction of the tank 10. In an upper wall 31*a* and an upper part of a side wall 31*b* of the header tube 31, excluding the end portion (the left-side end portion in this embodiment) where the refrigerant inlet tube 17 is connected and both longitudinal end walls of the header tube 31, numerous header tube refrigerant holes 31*c* are formed for channeling gas-liquid two-phase refrigerant, which flows through the header tube 31, out to the one-stage refrigerant tub 34.

Moreover, the header tube 31, excluding the end portion (the left-side end portion of the header tube 31 in this embodiment) where the refrigerant inlet tube 17 is connected, is provided with a gas-liquid separation member 32 covering the outer peripheral sides of the upper wall 31*a* and the upper part of the side wall 31*b* of the header tube 31, in a manner such that a gap is left between the outer peripheral sides of the header tube 31 and the gas-liquid separation member. The cross section of the gas-liquid separation member 32, as seen along the longitudinal direction of the tank 10, is substantially the shape of an upside-down letter U. Numerous header tube vent holes 32*a* are formed in the gas-liquid separation member 32. The header tube vent holes 32*a* allow the passage of gas refrigerant within the gas-liquid two-phase refrigerant flowing through the header tube 31 and supplied into the shell space SS of the tank 10 through the refrigerant inlet tube 17, and suppress the passage of liquid refrigerant within the gas-liquid two-phase refrigerant flowing through the header tube 31 and supplied into the shell space SS of the tank 10 through the refrigerant inlet tube 17.

The refrigerant tub 33 is a tub-shaped member for collecting liquid refrigerant within the gas-liquid two-phase refrigerant supplied into the shell space SS of the tank 10 through the refrigerant inlet tube 17 provided to the shell 11 of the tank 10, and then dropping the refrigerant onto the heat transfer tube bundle 20 below. The refrigerant tub 33 has primarily a one-stage refrigerant tub 34 and a two-stage refrigerant tub 35.

The one-stage refrigerant tub 34 is a tub-shaped member for collecting liquid refrigerant within the gas-liquid two-phase refrigerant supplied into the shell space SS of the tank 10 through the refrigerant inlet tube 17 provided to the shell 11 of the tank 10, and then dropping the refrigerant below. The one-stage refrigerant tub 34 extends along the longitudinal direction of the tank 10. The cross section of the one-stage refrigerant tub 34 in this embodiment, as seen along the longitudinal direction of the tank 10, is substantially the shape an upright letter U. The header tube 31 is disposed on top of a bottom wall 34a of the one-stage refrigerant tub 34. The gas-liquid two-phase refrigerant supplied into the shell space SS of the tank 10 through the refrigerant inlet tube 17 is thereby guided into the one-stage refrigerant tub 34 through the header tube refrigerant holes 31c of the header tube 31 and the header tube vent holes 32a of the gas-liquid separation member 32. At this time, the gas-liquid two-phase refrigerant guided into the one-stage refrigerant tub 34 from the header tube 31 is separated into gas and liquid by the gas-liquid separation member 32. Specifically, a large part of the liquid refrigerant within the gas-liquid two-phase refrigerant is guided to the one-stage refrigerant tub 34 and collected in the one-stage refrigerant tub 34 without passing through the header tube vent holes 32a of the gas-liquid separation member 32. The liquid refrigerant collected in the one-stage refrigerant tub 34 passes through a plurality of liquid refrigerant dropping holes 34c formed in the bottom wall 34a of the one-stage refrigerant tub 34, and falls down to the two-stage refrigerant tub 35 below. The gas refrigerant within the gas-liquid two-phase refrigerant is guided through the header tube vent holes 32a of the gas-liquid separation member 32 to a one-stage refrigerant tub above space SSd1, which is directly above the one-stage refrigerant tub 34 (in this embodiment, the space is vertically between the upper cover 36 and the one-stage refrigerant tub 34). The gas refrigerant guided to the one-stage refrigerant tub above space SSd1 flows toward the vapor outlet tube 18, and together with the gas refrigerant produced by evaporation in the heat transfer tube bundle 20, flows out of the shell space SS of the tank 10 through the vapor outlet tube 18.

The two-stage refrigerant tub 35 is a tub-shaped member that collects liquid refrigerant falling down from the one-stage refrigerant tub 34, and then drops the refrigerant onto the heat transfer tube bundle 20 below. The two-stage refrigerant tub 35 extends along the longitudinal direction of the tank 10. In the present embodiment, the two-stage refrigerant tub 35 is provided so that the longitudinal direction of the two-stage refrigerant tub 35 is the same direction as the longitudinal direction of the heat transfer tubes 21. The cross section of the two-stage refrigerant tub 35 in this embodiment, as seen along the longitudinal direction of the tank 10, is substantially the shape of an upright letter U. The two-stage refrigerant tub 35 protrudes farther outward than the one-phase refrigerant tub 34 when the two-stage refrigerant tub 35 is viewed from below (also when the two-stage refrigerant tub 35 is viewed along the longitudinal direction of the tank 10). Specifically, viewing the two-stage refrigerant tub 35 along the longitudinal direction of the tank 10, side walls 35b of the two-stage refrigerant tub 35 are disposed farther toward the outside than side walls 34b of the one-stage refrigerant tub 34. The liquid refrigerant falling down from the one-stage refrigerant tub 34 is thereby guided to the two-stage refrigerant tub 35 and collected in the two-stage refrigerant tub 35. The liquid refrigerant collected in the two-stage refrigerant tub 35 falls onto the heat transfer tube bundle 20 below through a plurality of liquid refrigerant dropping holes 35c formed in a bottom wall 35a of the two-stage refrigerant tub 35. In this embodiment, the space vertically between the one-phase refrigerant tub 34 and the two-stage refrigerant tub 35 is designated as a two-stage refrigerant tub above space SSd2.

The upper cover 36 is a roof-shaped member that is disposed above the refrigerant tub 33 (the one-stage refrigerant tub 34 in this embodiment) with a gap therebetween, and that corers the area above and at an upward slant from the refrigerant tub 33 (the one-stage refrigerant tub 34 in this embodiment). The upper cover 36 extends along the longitudinal direction of the tank 10, excluding the end portion where the refrigerant inlet tube 17 is connected to the header tube 31 (the left-side end portion of the header tube 31 in this embodiment). The cross section of the upper cover 36 in this embodiment, as seen along the longitudinal direction of the tank 10, is substantially the shape of an upside-down letter U. In this embodiment, the upper cover 36 has an upper wall 36a of which the cross section is in the shape of a horizontal plate as seen along the longitudinal direction of the tank 10, side walls 36b extending at a downward slant from the end portions of the upper wall 36a, and wall end parts 36c extending downward from the lower ends of the side walls 36b. In the present embodiment, the side walls 36b and the wall end parts 36c of the upper cover 36 extend at a downward slant to a location lower than the lower end of the portion where the vapor outlet tube 18 and the shell 11 connect (the portion shown by point X in FIG. 6). The upper wall 36a of the upper cover 36 is positioned above the header tube 31, which is positioned above the two-stage refrigerant tub 35.

Viewing the upper cover 36 along the longitudinal direction of the tank 10, protruding walk 36d that protrude downward are provided to the upper cover 36 in positions farther outward than the header tube 31 and the gas-liquid separation member 32 and farther inward than the side walls 34b of the one-stage refrigerant tub 34. The protruding walls 36d extend along the longitudinal direction of the tank 10. Viewing the upper cover 36 from above (similar to when the upper cover 36 is viewed along the longitudinal direction of the tank 10), the upper cover 36 covers the one-stage refrigerant tub 34 and protrudes farther to the outside than the one-stage refrigerant tub 34. Specifically, viewing the upper cover 36 along the longitudinal direction of the tank 10, the end portions of the side walls 36b of the upper cover 36 are disposed farther outward than the side walls 34b of the one-stage refrigerant tub 34. Lower ends of the wall end parts 36c are positioned higher than the two-stage refrigerant tub 35. A sprinkling device space SSd, which is a space vertically between the upper cover 36 and the refrigerant tub 33 (the two-stage refrigerant tub 35 in this embodiment), is formed in the shell space SS of the tank 10.

The sprinkling device space SSd has the one-stage refrigerant tub above space SSd1 described above, the two-stage refrigerant tub above space SSd2 described above, and a one-stage refrigerant tub side space SSd3. Viewing the liquid refrigerant sprinkling device 30 along the longitudinal direction of the tank 10, the one-stage refrigerant tub side space SSd3 is a space on the upper side of the two-stage refrigerant tub 35 and farther to the outside than the side walls 34b of the one-stage refrigerant tub 34. Within the shell space SS of the tank 10, the space other than the sprinkling device space SSd is a vapor main flow channel space SSv in which gas refrigerant produced by evaporation in the heat transfer tube bundle 20 flows toward the vapor outlet tube 18. Viewing the liquid refrigerant sprinkling device 30 along the longitudinal direction of the tank 10, the vapor main flow channel space SSv is communicating with the one-stage refrigerant tub side space SSd3 of the sprinkling device space SSd through the gap vertically between the end portions of the side walls 36b of the upper cover 36 and the upper ends of the side walls 35b of the two-stage refrigerant tub 35.

Thus, in this embodiment, a configuration having the one-stage refrigerant tub 34 and the two-stage refrigerant tub 35 is employed as the basic configuration of the liquid refrigerant sprinkling device 30. The falling film evaporator 1, in which liquid refrigerant is evaporated by heat exchange with the heat medium flowing within the heat transfer tubes 21 and the liquid refrigerant falling down from the two-stage refrigerant tub 35, is configured by this type of liquid refrigerant sprinkling device 30 and the heat transfer tube bundle 20 having the plurality of heat transfer tubes 21.

(5) Perpendicular Plates 40

A plurality of perpendicular plates 40, viewed along the longitudinal direction of the heat transfer tubes 21, are provided on the left and right sides of the header tube 31 of the liquid refrigerant sprinkling device 30, so as to be aligned in the longitudinal direction of the heat transfer tubes 21, as shown in FIG. 5. In the present embodiment, the plurality of perpendicular plates 40 are disposed at equal gaps apart from each other in the longitudinal direction of the heat transfer tubes 21.

The perpendicular plates 40 are plate-shaped members provided in the one-stage refrigerant tub side space SSd3 (a space on the lower side of the upper cover 36, the upper side of the two-stage refrigerant tub 35, and farther to the outside than the side walls 34b of the one-stage refrigerant tub 34 when the liquid refrigerant sprinkling device 30 is viewed along the longitudinal direction of the tank 10) so as to widen perpendicular to the longitudinal direction of the heat transfer tubes 21.

Specifically, the perpendicular plates 40 are provided so as to extend downward from the lower-surface sides near both left-right-directional end portions of the upper cover 36 (so that upper ends of the perpendicular plates 40 are connected with a lower surface of the upper cover 36). The perpendicular plates 40 in this embodiment include plates that extend downward from the lower surface of the left end portion of the upper wall 36a, of the upper cover 36 and the lower surface of the left side wall 36b, and plates that extend downward from the lower surface of the right end portion of the upper wall 36a of the upper cover 36 and the lower surface of the right side wall 36b. The lower ends of the perpendicular plates 40 are positioned slightly higher than the two-stage refrigerant tub 35 in the present embodiment. The perpendicular plates 40 in this embodiment are provided so that there is a portion covered by at least 90% in the vertical direction, between the two-stage refrigerant tub 35 and the upper cover 36. The perpendicular plates may also be provided so that there is a portion covered by at least 70% rather than at least 90%.

As can be seen from comparing FIG. 5, which is a cross-sectional view of the portion of the falling film evaporator 1 where the vapor outlet tube 18 is positioned as seen along the longitudinal direction of the tank 10, and FIG. 6, which is a cross-sectional view of the portion where the perpendicular plates 40 are positioned as seen along the longitudinal direction of the tank 10, the perpendicular plates 40 are provided to positions, in the longitudinal direction of the heat transfer tubes 21, other than the position where the shell 11 and the vapor outlet tube 18 connect. Specifically, the perpendicular plates 40 are provided along the longitudinal direction of the heat transfer tubes 21 so as to not be located on an extension line of the center axis of the vapor outlet tube 18.

Moreover, a plurality of the perpendicular plates 40 are provided on both one side and the other side of the vapor outlet tube 18 in the longitudinal direction of the heat transfer tubes 21, and in the present embodiment, the perpendicular plates are provided so that the numbers of plates on the one side and on the other side are the same.

(6) Characteristics of Present Embodiment (6-1)

Generally, in the vicinity of the vapor outlet tube connected to the tank, refrigerant on the verge of flowing out from the tank interior flows all together, and the flow rate tends to be higher than that of refrigerant passing through other areas. Therefore, carry-over occurs readily in some cases, in which liquid refrigerant flows at the same high flow rate as gas refrigerant and flows out of the tank.

As a countermeasure to this, in the falling film evaporator 1 of the present embodiment, a plurality of the perpendicular plates 40 are provided vertically between the upper cover 36 and the two-stage refrigerant tub 35, so as to be aligned in the longitudinal direction of the heat transfer tubes 21. Therefore, within the gas/liquid two-phase refrigerant that has flowed into the header tube 31 in the vicinity of one end of the tank 10, the liquid refrigerant flows along the longitudinal direction of the tank 10 (the longitudinal direction of the heat transfer tubes 21) and continues on to pass through the one-stage refrigerant tub 34 and the two-stage refrigerant tub 35 and fall down onto the heat transfer tube bundle 20. The gas refrigerant within the gas/liquid two-phase refrigerant that has flowed into the header tube 31 flows along the longitudinal direction of the tank 10 (the longitudinal direction of the heat transfer tubes 21), passes through the header tube refrigerant holes 31c and/or the header tube vent holes 32a in the left-right direction, flows upward through the left and right end portions of the upper cover 36 so as to envelop the left and right end portions, and flows out through the vapor outlet tube 18.

At this time, refrigerant flowing outward in the left-right direction and flowing between the upper cover 36 and the two-stage refrigerant tub 35 or between the upper cover 36 and the one-stage refrigerant tub 34, while flowing through the header tube 31 in the longitudinal direction, is restricted from flowing along the longitudinal direction of the heat transfer tubes 21 because of the partitioning by the plurality of perpendicular plates 40 provided in alignment in the longitudinal direction of the heat transfer tubes 21.

Therefore, the flow rate of gas refrigerant on the verge of flowing out through the portion where the tank 10 and the vapor outlet tube 18 connect is suppressed to be low by the perpendicular plates 40.

Thus, due to the flow rate being reduced in the vicinity of the portion where the tank 10 and the vapor outlet tube 18 connect, it is possible to suppress carry-over, in which the liquid refrigerant flows out while accompanied by the gas refrigerant having a higher flow rate. It is thereby possible to ensure that the problem of liquid compression in the compressor of the refrigeration apparatus does not occur readily.

(6-2)

The falling film evaporator 1 of the present embodiment is configured such that the perpendicular plates 40 extend downward from the upper cover 36, and there are no gaps between the upper ends of the perpendicular plates 40 and the lower surface of the upper cover 36. Therefore, gas refrigerant, which has a low specific gravity and which readily flows along the lower surface of the upper cover 36, can be channeled while being appropriately divided in the longitudinal direction of the heat transfer tubes 21, and carry-over can be more sufficiently suppressed.

The perpendicular plates 40 are provided on the left-right-directional outer sides of the header tube 31 so as to cover a large part of the space vertically between the upper cover 36 and the two-stage refrigerant tub 35. Therefore, the effect of dividing and channeling the gas refrigerant can be sufficiently achieved.

(6-3)

In the failing film evaporator 1 of the present embodiment, the perpendicular plates 40 are provided so as to be perpendicular to the longitudinal direction of the header tube 31 (the longitudinal direction of the heat transfer tubes 21). Therefore, the flow rate of refrigerant flowing below the upper cover 36 can be suppressed to be low.

Moreover, a plurality of the perpendicular plates 40 are provided on both one side and the other side of the vapor outlet tube 18, with respect to the longitudinal direction of the heat transfer tubes 21. Therefore, the flow rate of refrigerant flowing below the upper cover 36 can be equalized in different positions along the longitudinal direction of the heat transfer tubes 21, more so than in cases in which no such perpendicular plates 40 are provided.

(6-4)

In the failing film evaporator 1 of the present embodiment, the header tube 31 and the two-stage refrigerant tub 35 are provided so as to extend in the same direction as the longitudinal direction of the heat transfer tubes 21 and/or the longitudinal direction of the tank 10. Therefore, liquid refrigerant can be dropped onto the heat transfer tube bundle 20 from a greater area, greater area of contact between the liquid refrigerant and the heat transfer tube bundle 20 can be ensured, and evaporation efficiency can be increased.

Thus, even in cases in which the header tube 31 and/or the two-stage refrigerant tub 35 are extended along the longitudinal direction of the heat transfer tubes 21 in order to increase evaporation efficiency, the refrigerant flow rate in the longitudinal direction can be made uniform by providing the perpendicular plates 40 as described above. It is thereby possible to ensure that a high flow rate is not caused locally in the vicinity of the vapor outlet tube 18.

(7) Other Embodiments

In the above embodiment, an example of an embodiment of the present invention was described, but the above embodiment is not meant to limit the invention of the present application, and the invention is not limited to the above embodiment. The invention of the present application naturally includes aspects in which appropriate changes have been made without deviating from the scope of the invention.

(7-1) Other Embodiment A

In the above embodiment, an example was described of a case in which the vapor outlet tube 18 is provided so as to extend from obliquely above the shell 11.

However, the manner in which the vapor outlet tube 18 and the shell 11 are connected is not limited to this arrangement.

For example, the vapor outlet tube 18 may be provided so as to extend vertically upward from the upper end portion of the shell 11.

(7-2) Other Embodiment B

In the above embodiment, an example was described of a case in which the perpendicular plates 40 have surfaces that widen perpendicular to the longitudinal direction of the heat transfer tubes 21.

However, the perpendicular plates 40 are not limited to being completely perpendicular relative to the longitudinal direction of the heat transfer tubes 21, and may, e.g., be appropriately inclined within a range of 70 to 110 degrees relative to the longitudinal direction of the heat transfer tubes 21.

(7-3) Other Embodiment C

In the above embodiment, an example was described of a case in which the heat transfer tube bundle 20 housed within the tank 10 is disposed so that the longitudinal direction of the heat transfer tube bundle 20 and the longitudinal direction of the tank 10 are the same direction.

However, the heat transfer tube bundle 20 housed within the tank 10 may be disposed so that the longitudinal direction of the heat transfer tube bundle 20 and the longitudinal direction of the tank 10 differ somewhat, and the heat transfer tube bundle 20 may be disposed within the tank 10 so that, e.g., the longitudinal direction of the heat transfer tube bundle 20 and the longitudinal direction of the tank 10 are within a range of ±20 degrees.

(7-4) Other Embodiment D

In the above embodiment, an example was described of a case in which the perpendicular plates 40 are provided only to the outer-side portions between the two-stage refrigerant tub 35 and the upper cover 36.

Figure 7:
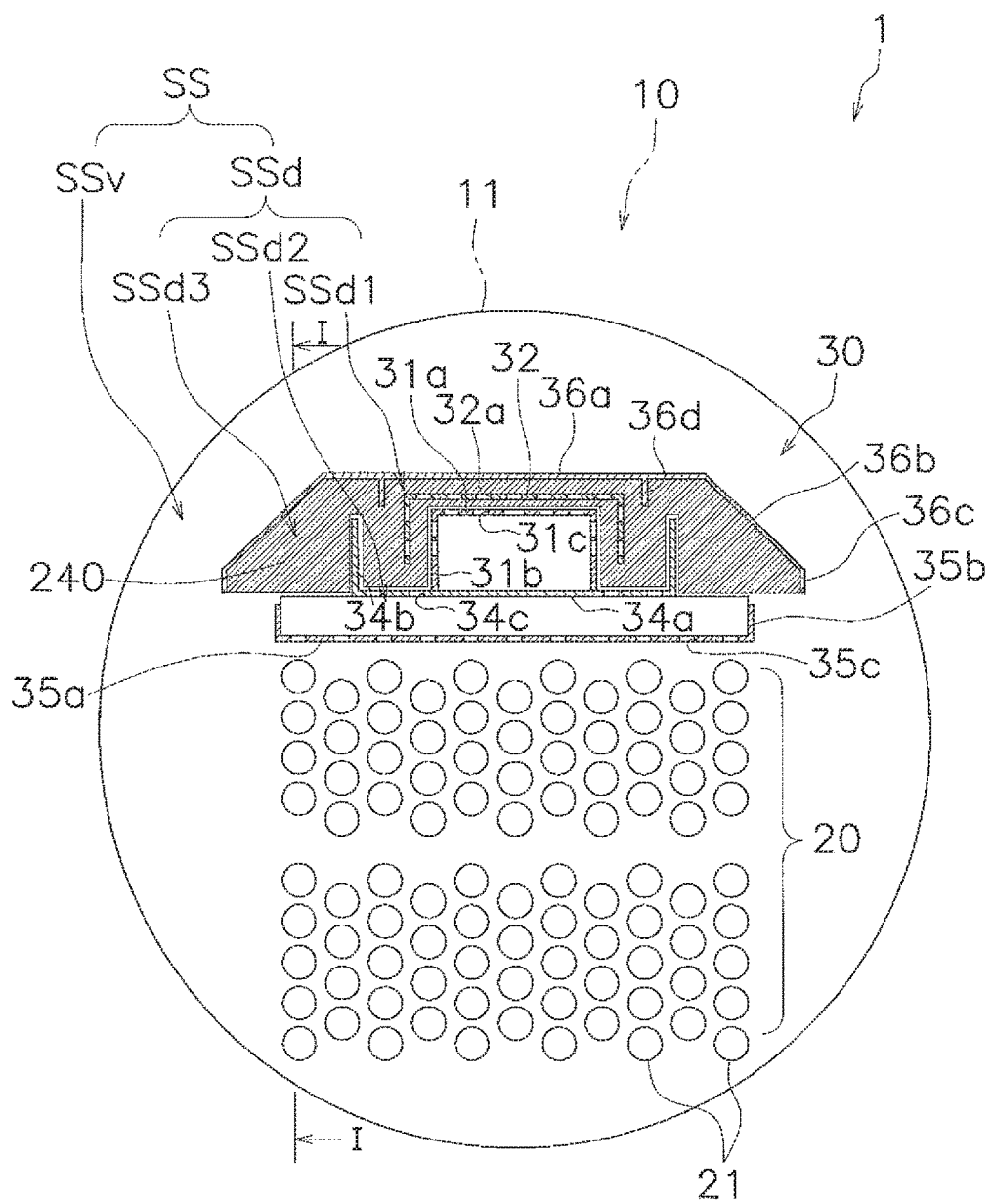
FIG. 7 is a cross-sectional view of a falling film evaporator according to another embodiment (D), as seen along the longitudinal direction of the tank.

However, for example, the perpendicular plates 240 may widen through a portion that is vertically between the one-stage refrigerant tub 34 and the upper cover 36 and that excludes the inside of the header tube 31, in the manner of the perpendicular plates 240 shown in FIG. 7. Specifically, the perpendicular plates 240 may be configured as widening so as to spread through the entire area between the two-stage refrigerant tub 35 and the upper cover 36.

In this case, each of the perpendicular plates 240 need not cover the entire area between the two-stage refrigerant tub 35 and the upper cover 36 through the use of a single plate-shaped member, and may be configured by, e.g., a plurality of members including a member that widens underneath the sides of the upper cover 36 that are farther outward in the left-right direction than the one-stage refrigerant tub 34 and widens to the upper-side portion of the two-stage refrigerant tub 35, and a member that widens between the upper cover 36 and the one-stage refrigerant tub 34.

Moreover, the perpendicular plates may be provided so as to widen in the portion that is vertically between the one-stage refrigerant tub 34 and the upper cover 36 and that excludes the space inside the header tube 31 and above the header tube 31. Because of the weight of the refrigerant, the refrigerant does not readily reach the space above the header tube 31 and below the upper cover 36, but much refrigerant readily passes through the portion that is vertically between the one-stage refrigerant tub 34 and the upper cover 36 and that excludes the space inside the header tube 31 and above the header tube 31. Therefore, the effect can be better achieved by providing perpendicular plates to this portion.

(7-5) Other Embodiment E

In the above embodiment, an example was described of a case in which no members were disposed between the vapor outlet tube 18 and the upper cover 36.

Figure 8:
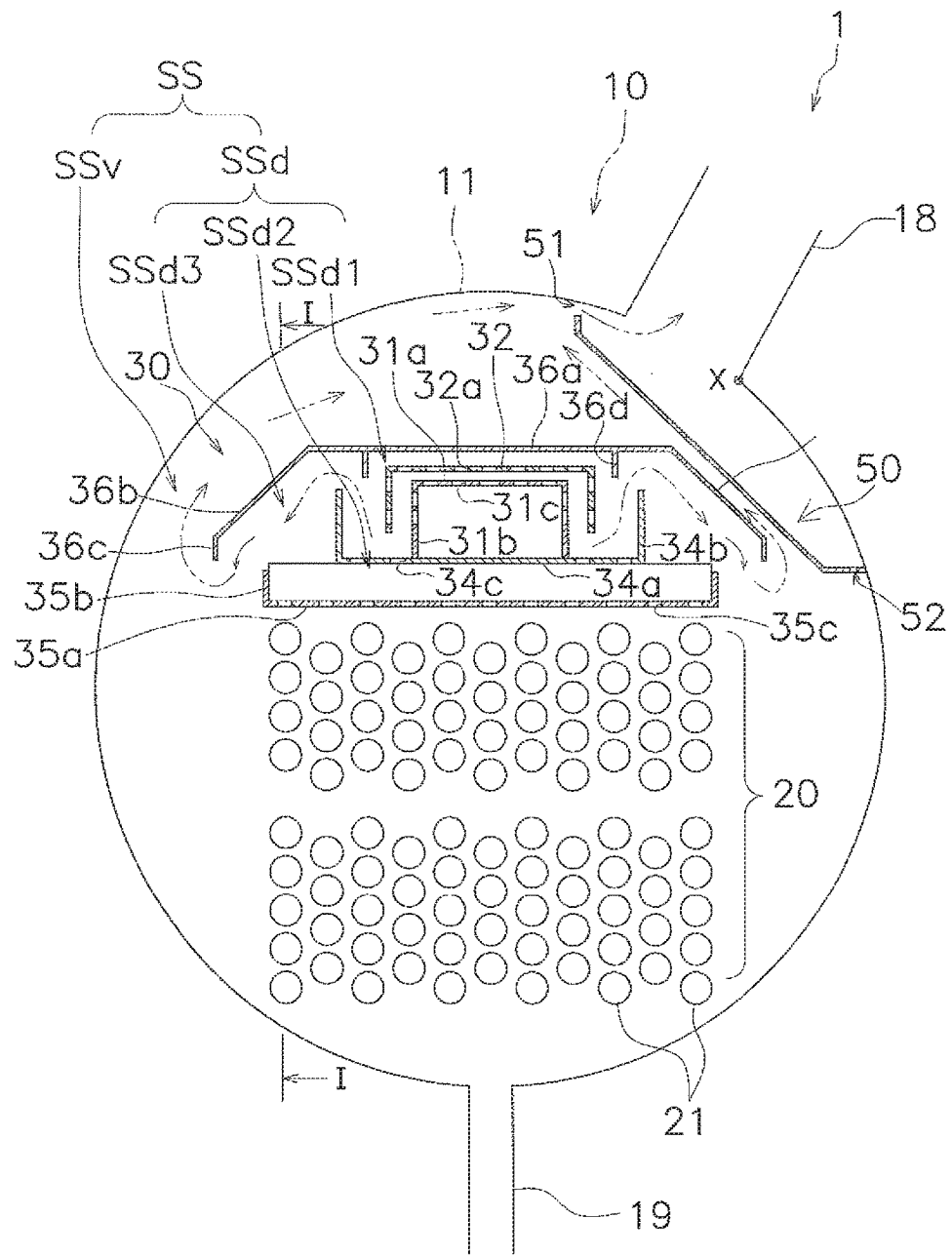
FIG. 8 is a cross-sectional view of a failing film evaporator according to another embodiment (E), as seen along the longitudinal direction of the tank.

However, for example, a separating member 50 that widens so as to separate the vapor outlet tube 18 and the liquid refrigerant sprinkling device 30 may be provided inside the tank 10 as shown in FIG. 8. This separating member 50 covers the area below the lowest portion of the portion where the tank 10 and the vapor outlet tube 18 connect as seen along the axial direction of the heat transfer tubes 21, and extends far enough to rise above the upper side of the vapor outlet tube 18 as seen in the direction in which the vapor outlet tube 18 extends from the tank 10.

In this case, refrigerant flowing out from the header tube 31 envelops the upper cover 36 in the portion far from the vapor outlet tube 18 and then flows so as to head toward the vapor outlet tube 18. In the portion near the vapor outlet tube 18, the refrigerant, after enveloping the upper cover 36, then passes through a narrow gap between the upper cover 36 and the separating member 50 and heads toward the vapor outlet tube 18. Therefore, the path of the refrigerant flow channel can be made uniform in the area near the vapor outlet tube 18 and the area far from the vapor outlet tube 18.

(7-6) Other Embodiment F

In the above embodiment, an example was described in which the shape of each perpendicular plate 40 was a plate shape.

However, for example, each perpendicular plate 40 may be provided with a plurality of openings passing through in the plate thickness direction. Even when openings are thus provided to the perpendicular plates 40, refrigerant flowing along the longitudinal direction of the heat transfer tubes 21 can be trapped and the movement of refrigerant in this direction can be restricted, by, e.g., designing the openings to be small to a certain extent.

(7-7) Other Embodiment G

In the above embodiment, an example was described of a case in which the plurality of perpendicular plates 40 are disposed at equal gaps apart from each other in the longitudinal direction of the heat transfer tubes 21.

Figure 9:
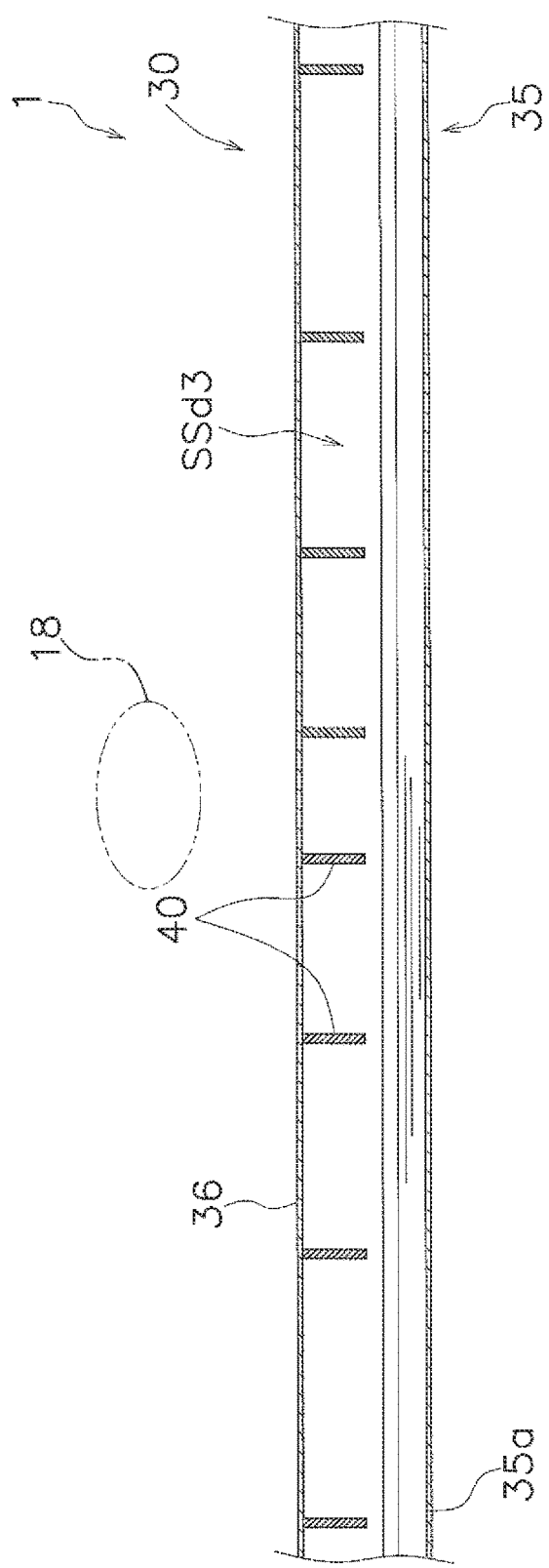
FIG. 9 is a drawing relating to another embodiment (G) and showing a modification of the shape shown in FIG. 4.

However, for example, the plurality of perpendicular plates 40 may be disposed so that the gaps between plates disposed in the vicinity of the vapor outlet tube 18 (gaps in the longitudinal direction of the heat transfer tubes 21) are narrower than the gaps between plates disposed farther away from the vapor outlet tube 18 (gaps in the longitudinal direction of the heat transfer tubes 21), as shown in FIG. 9.

In this case, refrigerant tends to flow all together in the portions near the vapor outlet tube 18 in the longitudinal direction of the heat transfer tubes 21, but disposing the perpendicular plates 40 so as to have narrow gaps therebetween in these portions makes it possible to more effectively impede the flow of refrigerant that flows along the longitudinal direction of the heat transfer tubes 21 in these portions, and to increase the effect of making refrigerant distribution uniform.

In FIG. 9, the perpendicular plates 40 disposed on an outer side of the one-stage refrigerant tub 34 are shown, but the perpendicular plates may, e.g., be disposed so that the gaps between plates disposed in the vicinity of the vapor outlet tube 18 are narrower than the gaps between plates disposed farther away from the vapor outlet tube 18, similar to the case of Other Embodiment D in which the plates are disposed on the inner sides of the one-stage refrigerant tub 34.

(7-8) Other Embodiment H

In the above embodiment, an example was described of a case in which no members were disposed between the vapor outlet tube 18 and the upper cover 36.

Figure 10:
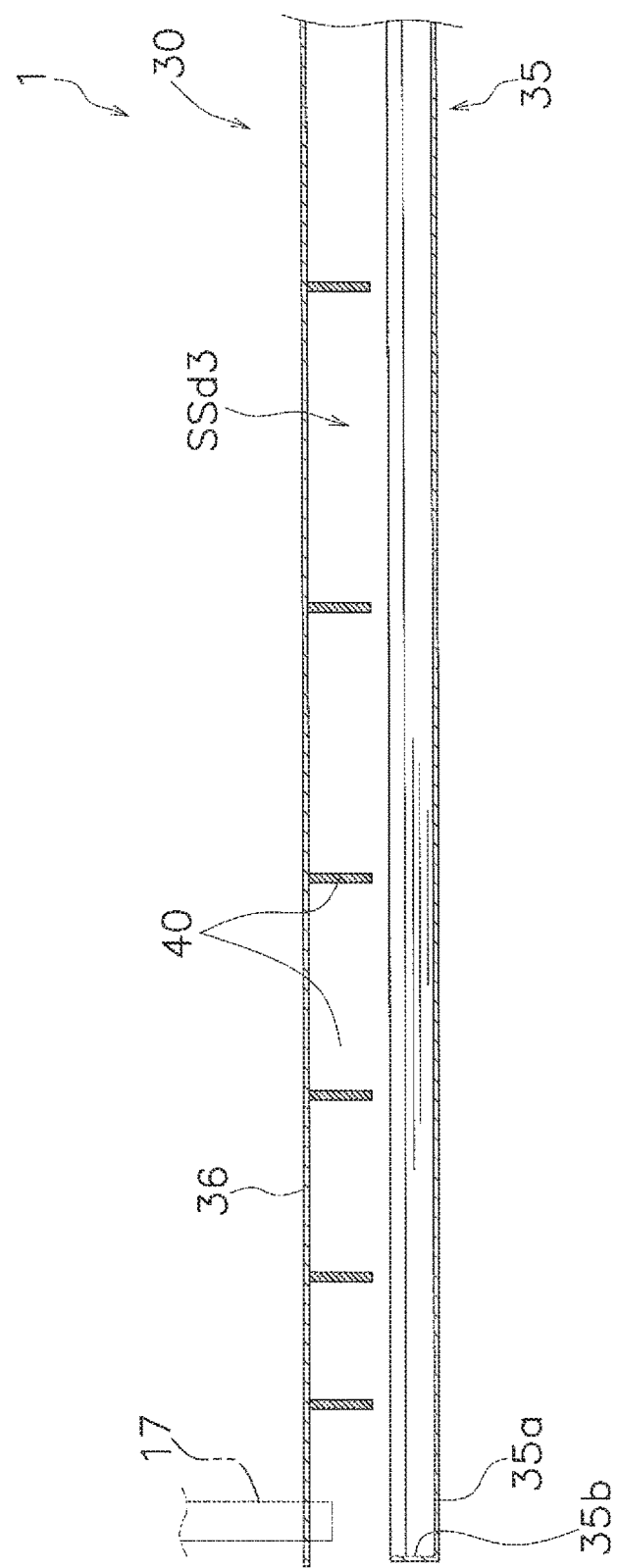
FIG. 10 is a drawing relating to another embodiment (H) and showing a modification of the shape shown in FIG. 4.

However, for example, the plurality of perpendicular plates 40 may be disposed so that the gaps between plates disposed in the vicinity of the refrigerant inlet tube 17 (gaps in the longitudinal direction of the heat transfer tubes 21) are narrower than the gaps between plates disposed farther away from the refrigerant inlet tube 17 (gaps in the longitudinal direction of the heat transfer tubes 21), as shown in FIG. 10.

In this case, there is a tendency for the flow rate to be high in the portion near the refrigerant inlet tube 17 in the longitudinal direction of the heat transfer tubes 21 because the refrigerant flows into the tank 10 from one location, but disposing the perpendicular plates 40 with narrow intervals therebetween in this portion makes it possible to more effectively impede the flow of refrigerant that flows along the longitudinal direction of the heat transfer tubes 21 in this portion, and to increase the effect of making refrigerant distribution uniform.

In FIG. 10, the perpendicular plates 40 disposed on an outer side of the one-stage refrigerant tub 34 are shown, but the perpendicular plates may, e.g., be disposed so that the gaps between plates disposed in the vicinity of the refrigerant inlet tube 17 are narrower than the gaps between plates disposed farther away from the refrigerant inlet tube 17, similar to the case of Other Embodiment D in which the plates are disposed on the inner sides of the one-stage refrigerant tub 34.

Should Other Embodiment G and Other Embodiment H be implemented simultaneously, the gaps between plates may be narrow for those near the vapor outlet tube 18 and those near the refrigerant inlet tube 17, and the gaps between plates may be wide for those far from the vapor outlet tube 18 and those far from the refrigerant inlet tube 17. Specifically, the plurality of perpendicular plates may be disposed so that the gaps therebetween may widen and then again narrow, progressively away from the refrigerant inlet tube 17 and toward the vapor outlet tube 18 side along the longitudinal direction of the heat transfer tubes 21.

(8) Simulation Results

A structure employing the perpendicular plates 40 in the manner of the above embodiment, a structure in which the perpendicular plates 40 widened through the entire are between the two-stage refrigerant tub 35 and the upper cover 36 in the manner of Other Embodiment D, and a structure in which the separating member 50 was provided in the manner of Other Embodiment E were subjected to a simulation to study the distribution of the refrigerant flow rate (left and right average values of the flow rate of refrigerant flowing downward at the left and right end portions of the upper cover 30 through the longitudinal direction of the heat transfer tubes 21. The simulation results are shown in FIG. 11.

Figure 11:
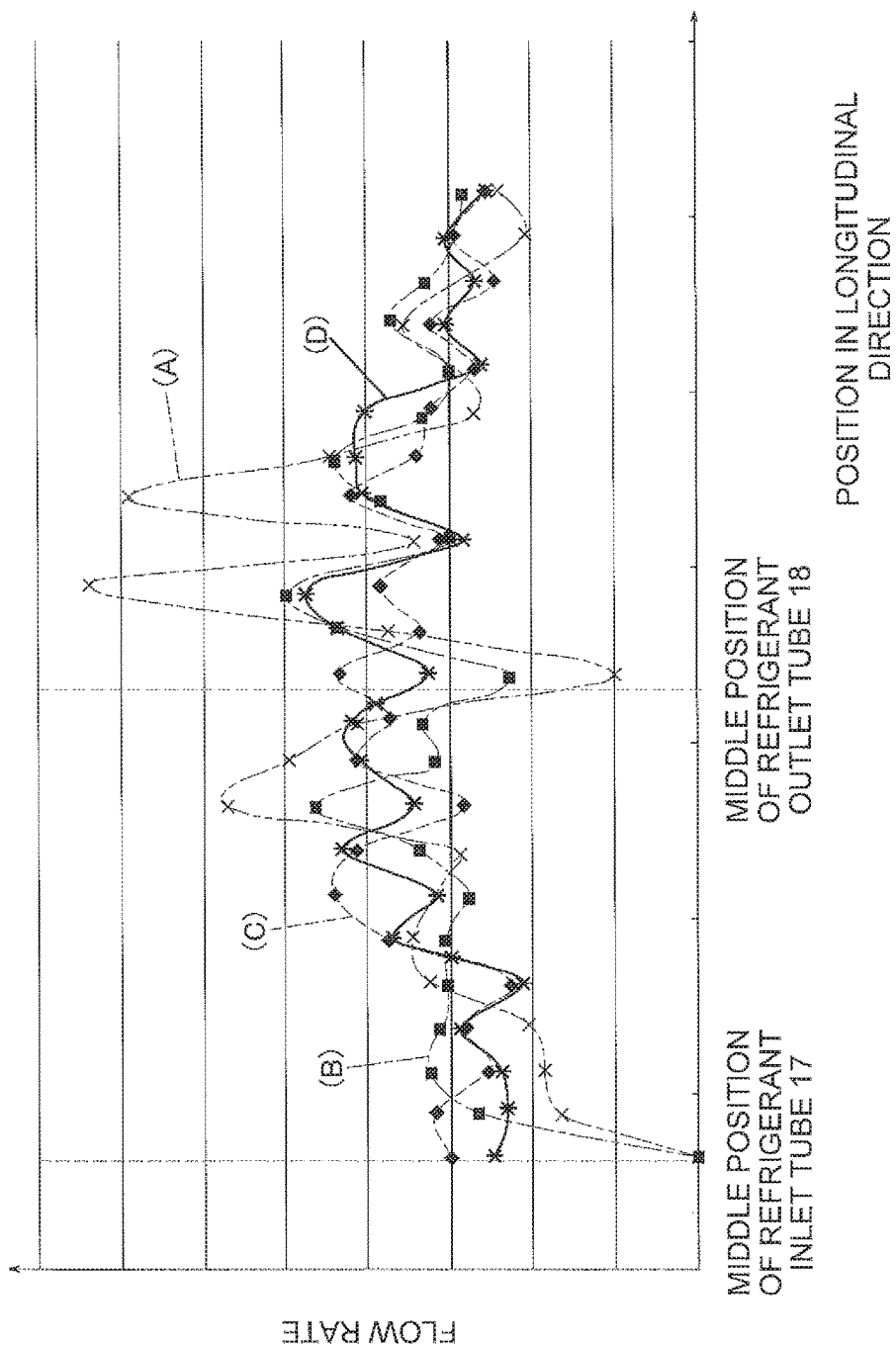
FIG. 11 is a drawing showing simulation results for flow rate distribution.

In FIG. 11, (A) depicts an example in which the separating member 50 is provided only in the vicinity of the vapor outlet tube 18 (an example of the length in the longitudinal direction of the heat transfer tubes 21 being short), and the perpendicular plates 40 are not provided; (B) depicts an example in which the separating member 50 is provided not only in the vicinity of the vapor outlet tube 18 but also as widening entirely along the longitudinal direction of the heat transfer tubes 21, and the perpendicular plates 40 are not provided; (C) depicts an example in which the separating member 50 is provided not only in the vicinity of the vapor outlet tube 18 but also as widening entirely along the longitudinal direction of the heat transfer tubes 21, and the perpendicular plates 40 are configured so as to widen through the entire area between the two-stage refrigerant tub 35 and the upper cover 36 in the manner of Other Embodiment D; and (D) depicts an example in which the separating member 50 is provided not only in the vicinity of the vapor outlet tube 18 but also as widening entirely along the longitudinal direction of the heat transfer tubes 21, and the perpendicular plates 40 are provided only to the left-right-directional ends between the two-stage refrigerant tub 35 and the upper cover 36 in the manner of the above embodiment.

As shown in the simulation results, it is clear that the standard deviation of the refrigerant flow rate is large when the perpendicular plates 40 are not provided, but the standard deviation of the refrigerant flow rate can be suppressed to be low and the flow rate can be made uniform when the perpendicular plates 40 are provided.

INDUSTRIAL APPLICABILITY

The present invention is widely applicable to falling film evaporators in which gas/liquid two-phase refrigerant is supplied into a tank through a refrigerant inlet tube by a liquid refrigerant sprinkling device provided vertically between a heat transfer tube bundle within the tank and a vapor outlet tube in the upper part of the tank, liquid refrigerant contained within the gas/liquid two-phase refrigerant is dropped onto the heat transfer tube bundle, and the liquid refrigerant is evaporated by the heat transfer tube bundle.

What is claimed is:

1. A falling film evaporator used in a refrigeration apparatus, the falling film evaporator comprising:
   a heat transfer tube bundle with a heat medium channeled to an interior thereof, the heat transfer tube bundle having a plurality of longitudinally extending heat transfer tubes;
   a tank with the heat transfer tube bundle disposed therein, the tank being provided with a refrigerant inflow port;
   a liquid refrigerant sprinkling part arranged to drop liquid refrigerant, which is contained in gas/liquid two-phase refrigerant supplied into the refrigerant inflow port, onto the heat transfer tube bundle;
   a vapor outlet tube extending from an upper part of the tank;
   a cover having a portion positioned in a location inside the tank and higher than the liquid refrigerant sprinkling part; and
   an impeding member provided between the liquid refrigerant sprinkling part and the cover at a different position than the vapor outlet tube along the longitudinal direction of the heat transfer tubes, and the impeding member impeding the flow of refrigerant that flows between the liquid refrigerant sprinkling part and the cover and flows in the longitudinal direction of the heat transfer tubes,
   the impeding member extending downward from a lower surface of the cover.

2. A falling film evaporator used in a refrigeration apparatus, the falling film evaporator comprising:
   a heat transfer tube bundle with a heat medium channeled to an interior thereof, the heat transfer tube bundle having a plurality of longitudinally extending heat transfer tubes;
   a tank with the heat transfer tube bundle disposed therein, the tank being provided with a refrigerant inflow port;
   a liquid refrigerant sprinkling part arranged to drop liquid refrigerant, which is contained in gas/liquid two-phase refrigerant supplied into the tank through the refrigerant inflow port, onto the heat transfer tube bundle;
   a vapor outlet tube extending from an upper part of the tank;
   a cover having a portion positioned in a location inside the tank and higher than the liquid refrigerant sprinkling part; and
   a plurality of impeding member provided between the liquid refrigerant sprinkling part and the cover at a different position than the vapor outlet tube along the longitudinal direction of the heat transfer tubes, and the impeding members impeding the flow of refrigerant that flows between the liquid refrigerant sprinkling part and the cover and flows in the longitudinal direction of the heat transfer tubes,
   the impeding members being provided in alignment in the longitudinal direction of the heat transfer tubes so as to have a portion in which the impeding members close to the vapor outlet tube in the longitudinal direction of the heat transfer tubes have narrow gaps between each other.

3. A falling film evaporator used in a refrigeration apparatus, the falling film evaporator comprising:
   a heat transfer tube bundle with a heat medium channeled to an interior thereof, the heat transfer tube bundle having a plurality of longitudinally extending heat transfer tubes;
   a tank with the heat transfer tube bundle disposed therein, the tank being provided with a refrigerant inflow port;
   a liquid refrigerant sprinkling part arranged to drop liquid refrigerant, which is contained in gas/liquid two-phase refrigerant supplied into the tank through the refrigerant inflow port, onto the heat transfer tube bundle;
   a vapor outlet tube extending from an upper part of the tank;
   a cover having a portion positioned in a location inside the tank and higher than the liquid refrigerant sprinkling part; and
   a plurality of impeding member provided between the liquid refrigerant sprinkling part and the cover at a different position than the vapor outlet tube along the longitudinal direction of the heat transfer tubes, and the impeding members impeding the flow of refrigerant that flows between the liquid refrigerant sprinkling part and the cover and flows in the longitudinal direction of the heat transfer tubes,
   the impeding members being provided in alignment in the longitudinal direction of the heat transfer tubes so as to have a portion in which the impeding members close to the refrigerant inflow port in the longitudinal direction of the heat transfer tubes have narrow gaps between each other.

4. The falling film evaporator according to claim 1, wherein
the impeding member is a plate-shaped member having a surface perpendicular to the longitudinal direction of the heat transfer tubes.

5. The falling film evaporator according to claim 2, wherein
the impeding member is a plate-shaped member having a surface perpendicular to the longitudinal direction of the heat transfer tubes.

6. The falling film evaporator according to claim 3, wherein
the impeding member is a plate-shaped member having a surface perpendicular to the longitudinal direction of the heat transfer tubes.

7. The falling film evaporator according to claim 1, wherein
the impeding member is provided on both sides of the vapor outlet tube with respect to the longitudinal direction of the heat transfer tubes.

8. The falling film evaporator according to claim 2, wherein
the impeding member is provided on both sides of the vapor outlet tube with respect to the longitudinal direction of the heat transfer tubes.

9. The falling film evaporator according to claim 3, wherein
the impeding member is provided on both sides of the vapor outlet tube with respect to the longitudinal direction of the heat transfer tubes.

10. The falling film evaporator according to claim 1, wherein
the impeding member has a portion vertically covered by at least 70% between the liquid refrigerant sprinkling part and the cover.

11. The falling film evaporator according to claim 2, wherein
the impeding member has a portion vertically covered by at least 70% between the liquid refrigerant sprinkling part and the cover.

12. The falling film evaporator according to claim 3, wherein
the impeding member has a portion vertically covered by at least 70% between the liquid refrigerant sprinkling part and the cover.

13. The falling film evaporator according to claim 1, further comprising
a header tube provided between the liquid refrigerant sprinkling part and the cover, the header tube having a plurality of refrigerant holes arranged to allow refrigerant to pass through from an inner side toward an outside as seen in the longitudinal direction of the heat transfer tubes, and the header tube being capable of guiding refrigerant flowing in through the refrigerant inflow port in a direction extending along the longitudinal direction of the heat transfer tubes while channeling the refrigerant out via the refrigerant holes; and
a one-stage refrigerant tub disposed above the liquid refrigerant sprinkling part, the one-stage refrigerant tub being capable of receiving refrigerant flowing out from the header tube via the refrigerant holes and guiding the refrigerant to the liquid refrigerant sprinkling part,
the impeding members being provided at least at a position that is on the outer side of the header tube and that is enclosed by the one-stage refrigerant tub and the cover.

14. The falling film evaporator according to claim further comprising
a header tube provided between the liquid refrigerant sprinkling part and the cover, the header tube having a plurality of refrigerant holes arranged to allow refrigerant to pass through from an inner side toward an outside as seen in the longitudinal direction of the heat transfer tubes, and the header tube being capable of guiding refrigerant flowing in through the refrigerant inflow port in a direction extending along the longitudinal direction of the heat transfer tubes while channeling the refrigerant out via the refrigerant holes; and
a one-stage refrigerant tub disposed above the liquid refrigerant sprinkling part, the one-stage refrigerant tub being capable of receiving refrigerant flowing out from the header tube via the refrigerant holes and guiding the refrigerant to the liquid refrigerant sprinkling part,
the impeding members being provided at least at a position that is on the outer side of the header tube and that is enclosed by the one-stage refrigerant tub and the cover.

15. The falling film evaporator according to claim 3, further comprising
a header tube provided between the liquid refrigerant sprinkling part and the cover, the header tube having a plurality of refrigerant holes arranged to allow refrigerant to pass through from an inner side toward an outside as seen in the longitudinal direction of the heat transfer tubes, and the header tube being capable of guiding refrigerant flowing in through the refrigerant inflow port in a direction extending along the longitudinal direction of the heat transfer tubes while channeling the refrigerant out via the refrigerant holes; and
a one-stage refrigerant tub disposed above the liquid refrigerant sprinkling part, the one-stage refrigerant tub being capable of receiving refrigerant flowing out from the header tube via the refrigerant holes and guiding the refrigerant to the liquid refrigerant sprinkling part,
the impeding members being provided at least at a position that is on the outer side of the header tube and that is enclosed by the one-stage refrigerant tub and the cover.

16. The falling film evaporator according to claim 7, further comprising:
a header tube provided between the liquid refrigerant sprinkling part and the cover, the header tube having a plurality of refrigerant holes arranged to allow refrigerant to pass through from an inner side toward an outside as seen in the longitudinal direction of the heat transfer tubes, and the header tube being capable of guiding refrigerant flowing in through the refrigerant inflow port in a direction extending along the longitudinal direction of the heat transfer tubes while channeling the refrigerant out via the refrigerant holes; and
a one-stage refrigerant tub disposed above the liquid refrigerant sprinkling part, the one-stage refrigerant tub being capable of receiving refrigerant flowing out from the header tube via the refrigerant holes and guiding the refrigerant to the liquid refrigerant sprinkling part,
the impeding members being provided at least at a position that is on the outer side of the header tube and that is enclosed by the one-stage refrigerant tub and the cover.

17. The falling film evaporator according to claim 8, further comprising:
a header tube provided between the liquid refrigerant sprinkling part and the cover, the header tube having a plurality of refrigerant holes arranged to allow refrigerant to pass through from an inner side toward an outside as seen in the longitudinal direction of the heat transfer tubes, and the header tube being capable of guiding refrigerant flowing in through the refrigerant inflow port in a direction extending along the longitudinal direction of the heat transfer tubes while channeling the refrigerant out via the refrigerant holes; and a one-stage refrigerant tub disposed above the liquid refrigerant sprinkling part, the one-stage refrigerant tub being capable of receiving refrigerant flowing out from the header tube via the refrigerant holes and guiding the refrigerant to the liquid refrigerant sprinkling part, the impeding members being provided at least at a position that is on the outer side of the header tube and that is enclosed by the one-stage refrigerant tub and the cover.

18. The falling film evaporator according to claim 1, wherein the liquid refrigerant sprinkling part is arranged so that the longitudinal direction of the liquid refrigerant sprinkling part is a same direction as the longitudinal direction of the heat transfer tubes.

19. The falling film evaporator according to claim 2, wherein the liquid refrigerant sprinkling part is arranged so that the longitudinal direction of the liquid refrigerant sprinkling part is a same direction as the longitudinal direction of the heat transfer tubes.

20. The falling film evaporator according to claim 3, wherein the liquid refrigerant sprinkling part is arranged so that the longitudinal direction of the liquid refrigerant sprinkling part is a same direction as the longitudinal direction of the heat transfer tubes.

\* \* \* \* \*